United States Patent [19]

Altman et al.

[11] 4,047,207
[45] Sept. 6, 1977

[54] VIEWING SYSTEM FOR REFLEX CAMERA

[75] Inventors: Richard M. Altman, Woodland Hills; Thomas D. McLaughlin, Thousand Oaks, both of Calif.

[73] Assignee: Optigon Research & Development Corporation, Santa Monica, Calif.

[21] Appl. No.: 648,779

[22] Filed: Jan. 13, 1976

[51] Int. Cl.² ............... G03B 13/12; G03B 19/12
[52] U.S. Cl. ............................ 354/155; 354/152; 354/225
[58] Field of Search ........... 354/152, 155, 199, 200, 354/201, 223, 224, 225, 46, 197

[56] References Cited

U.S. PATENT DOCUMENTS

| 3,882,520 | 5/1975 | Kamp et al. | 354/197 |
| 3,890,626 | 6/1975 | Ettischer et al. | 354/197 |
| 3,903,537 | 9/1975 | Ettischer et al. | 354/197 |

Primary Examiner—L. T. Hix
Assistant Examiner—Alan Mathews
Attorney, Agent, or Firm—DeLio and Montgomery

[57] ABSTRACT

A viewfinder system for a single lens reflex camera where the field lens of the system is positionable in accordance with the distance of the objective lens exit pupil from the focal plane and eyepiece lenses are positionable in accordance with the field lens to maintain uniform viewfinder brightness without any essential change in image magnification.

20 Claims, 8 Drawing Figures

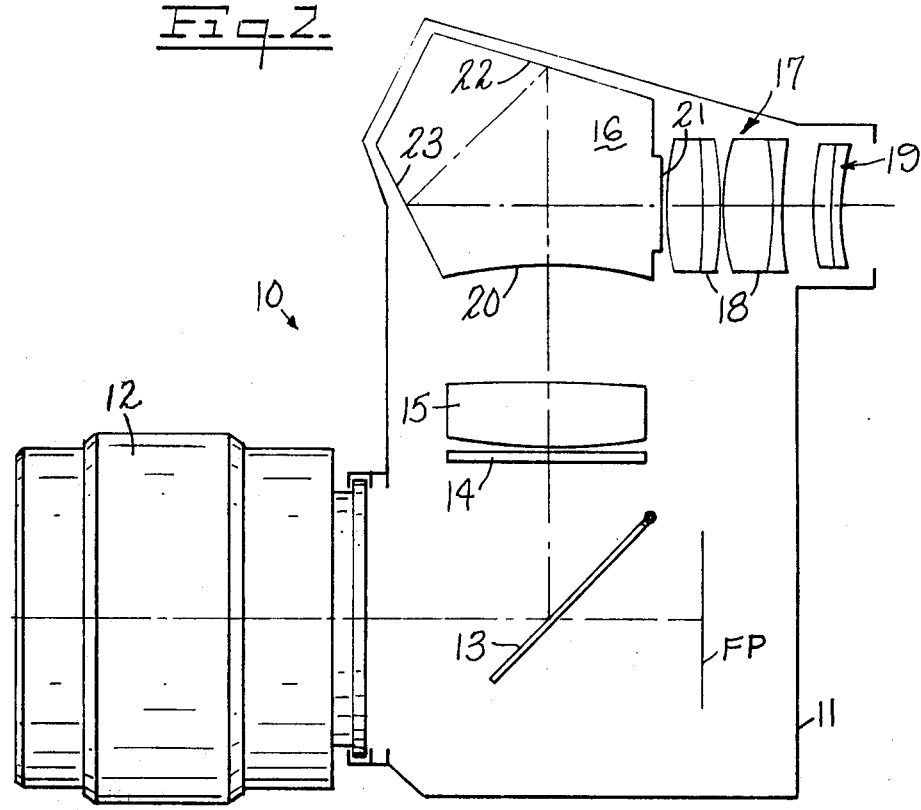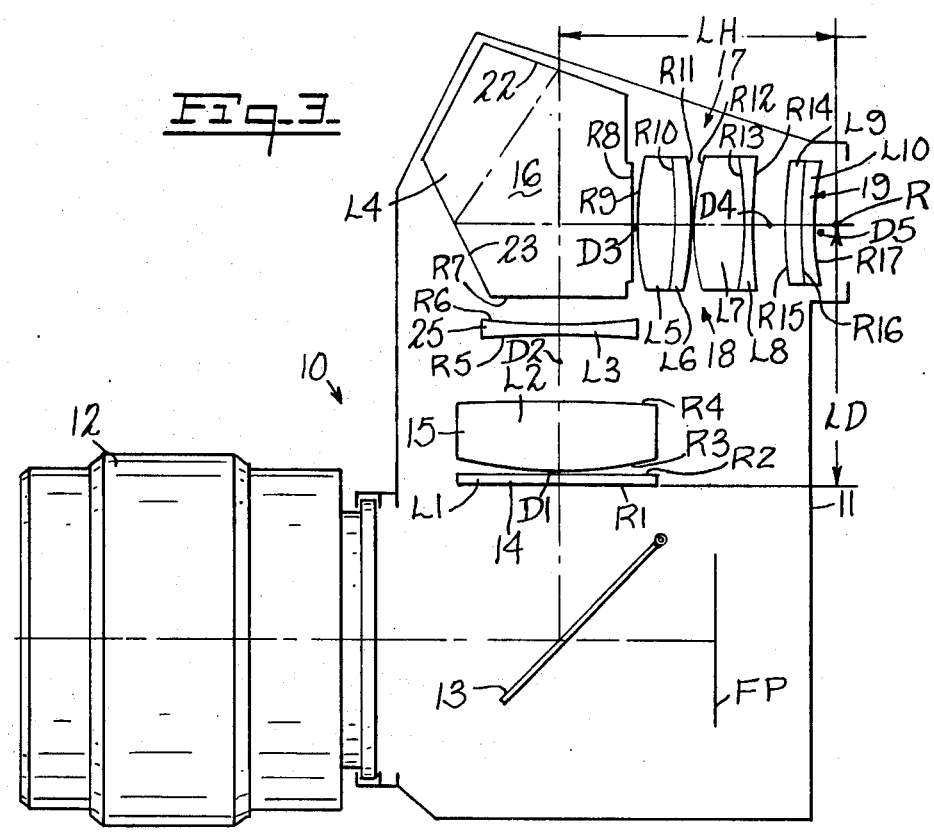

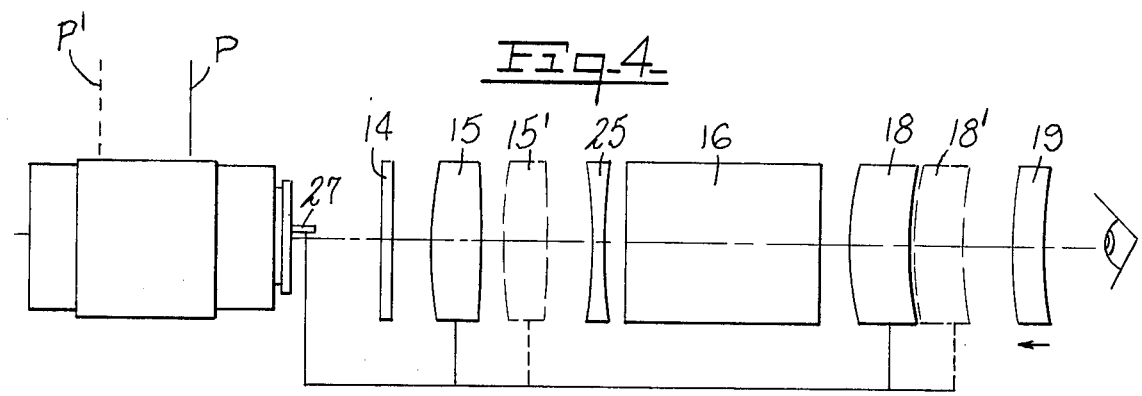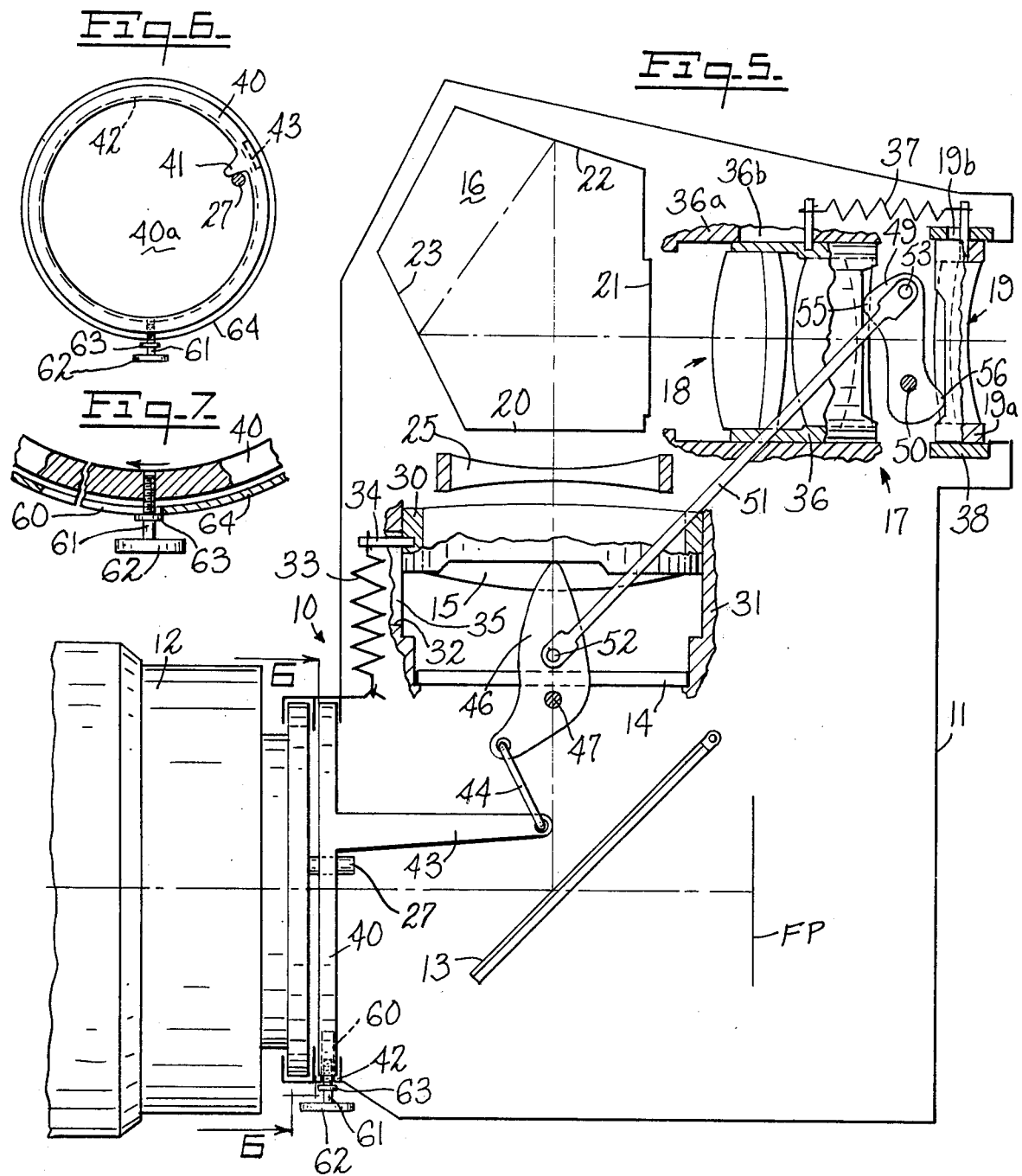

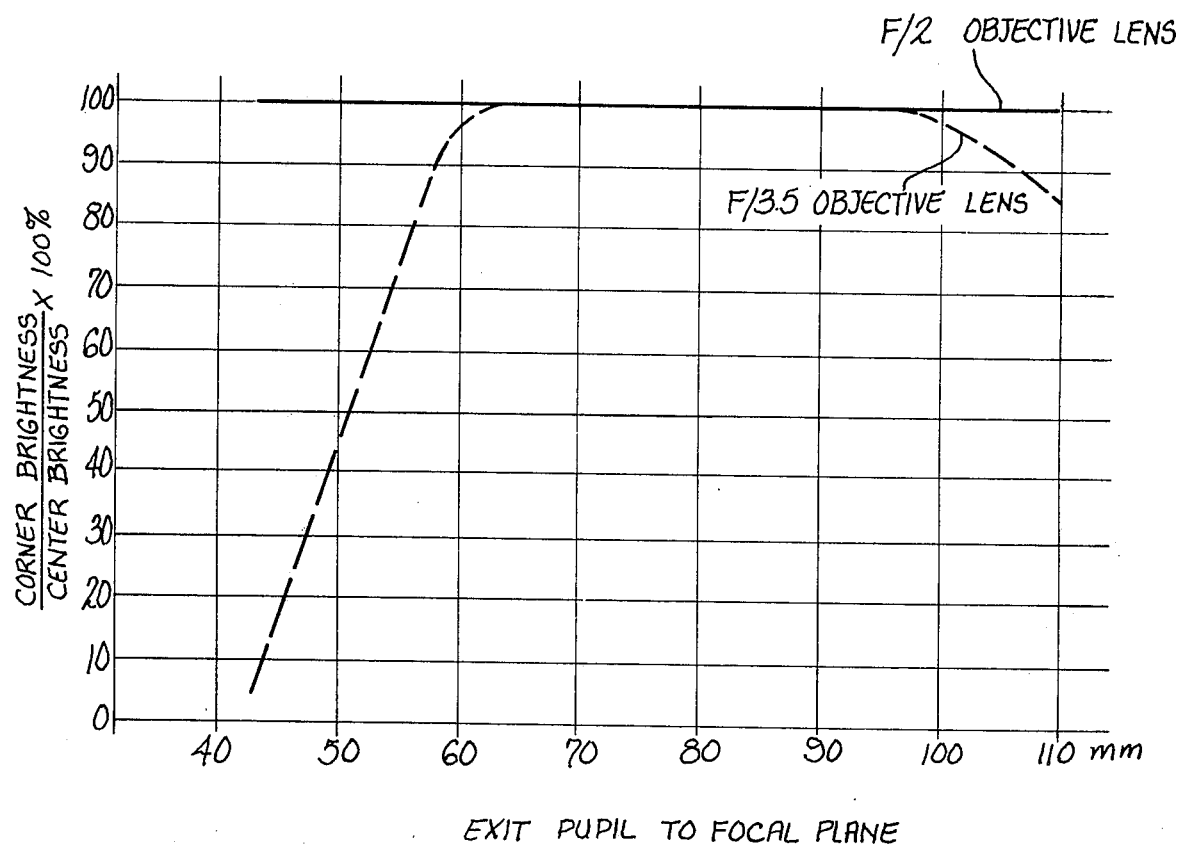

VIEWING SYSTEM FOR REFLEX CAMERA

This invention relates to camera viewfinding systems, and more particularly relates to viewing systems of reflex cameras utilizing a prism and adapted to accept interchangeable lenses.

Single lens reflex cameras have a viewfinding system which includes a mirror pivotally mounted behind the lens, a focusing screen, a field lens, a prism, and eyepieces to present an image of an object to the viewer.

The viewing system of a single lens reflex camera is basically designed for the original lens supplied with the camera, i.e., a lens of about 50mm – 58mm focal length. More specifically, the viewing system is designed in accordance with the location of the exit pupil of the standard lens. When other lenses having different exit pupil locations are used with the camera, the brightness of an image on the focusing screen is diminished, particularly around the edges.

To compensate for this change in lens exit pupil location and resultant change in viewfinder brightness and uniformity of brightness, some camera manufacturers design their cameras for interchangeable focusing screens, or a combination of focusing screen and field lens.

Besides the expense of these interchangeable screens and/or field lens-screen combination, the changing of these devices is time-consuming, and the serious photographer is burdened with yet more equipment to carry and manage.

The present invention provides a new and improved viewing system for a reflex camera which may be adjusted to compensate for location of the lens exit pupil, and which requires no interchangeable screens or field lenses, yet provides uniform brightness of field, and little, if any, noticeable decrease in overall brightness.

Briefly stated, the invention comprises the provision of a positionable field lens between the viewing screen and the prism, where the field lens is positioned in accordance with the location of the exit pupil of the lens with respect to the focal plane. Additionally, any eyepiece lens assembly behind the prism is positionable in accordance with the field lens to maintain constant magnification and avoid a "zooming" effect when the field lens is repositioned. The position of the field lens may be determined by a linkage operated by a coding means on the lens, or alternatively may be manually set.

An object of this invention is to provide a new and improved viewing system for a single lens reflex camera.

Another object of this invention is to provide a new and improved viewing system for a single lens reflex camera in which optical elements of the system are positionable in accordance with the location of the exit pupil of the lens used with the camera.

A further object of this invention is to provide a viewing system for a single lens reflex camera in which the field lens is positionable in accordance with the exit pupil location of the lens, and where the eyepiece elements are positioned with the field lens to avoid a change in magnification of the viewed object.

The features of the invention which are believed to be novel are particularly pointed out and distinctly claimed in the concluding portion of this specification. However, the invention together with further objects and advantages thereof may best be appreciated by reference to the following detailed description taken in conjunction with the drawings, wherein:

FIG. 2 is a side elevation of one viewfinding system for a single lens reflex camera embodying the invention, as shown in a camera;

FIG. 3 is a side elevation of another viewfinding system for a single lens reflex camera embodying the invention as shown in a camera;

FIG. 4 is a side elevation of a somewhat schematic representation of a viewfinder system embodying the invention;

FIG. 5 is a side elevation of a viewfinder system for a single lens reflex camera as shown in a camera and further showing a mechanical operating mechanism therefor;

FIG. 6 is a view seen in the line of planes 6—6 of FIG. 5;

FIG. 7 is an enlarged view, partially cut away, of a portion of FIG. 6; and

FIG. 8 is a plot of viewfinder corner to center brightness versus distance of exit pupil to focal plane.

Figure 1:
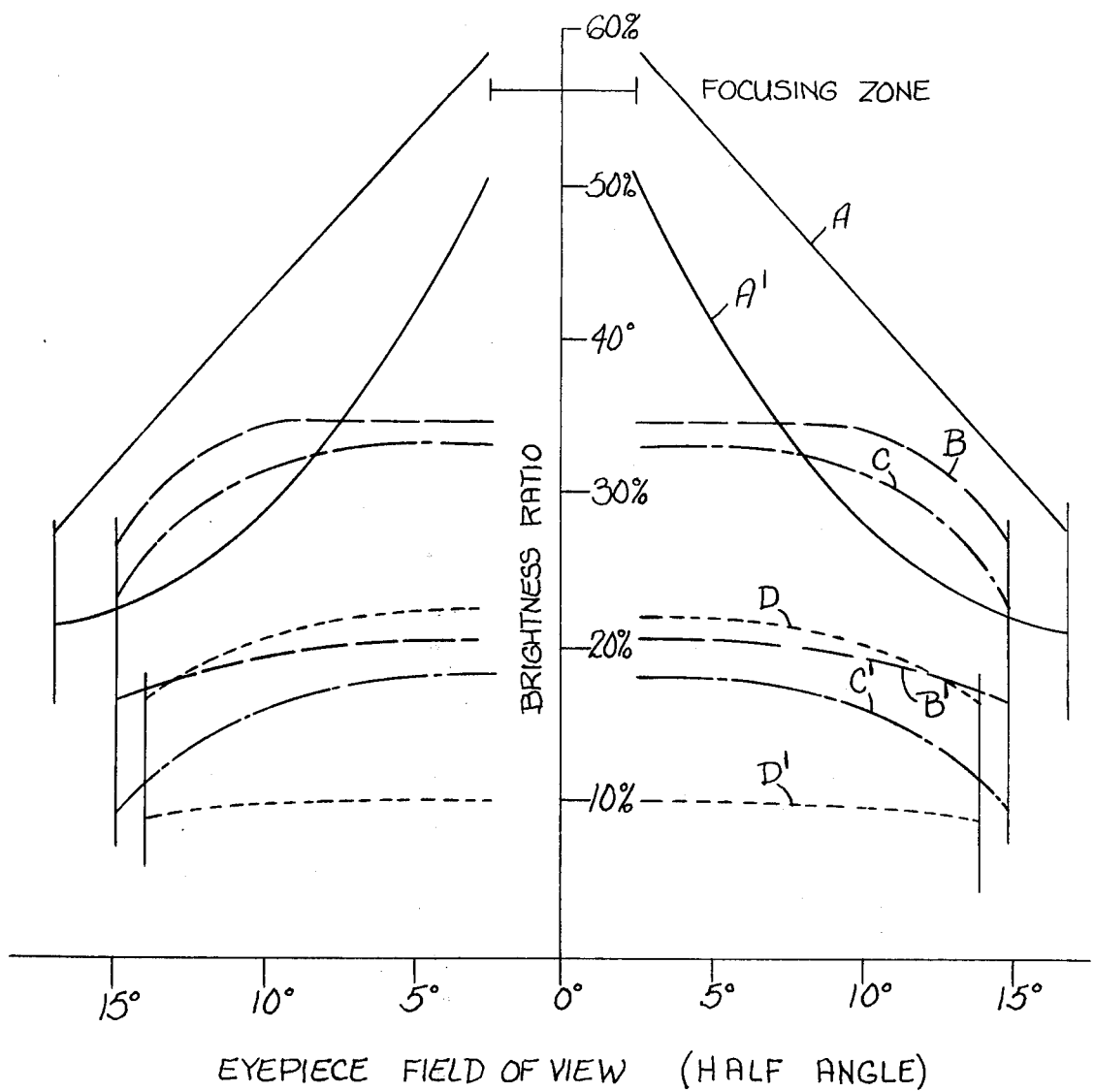
FIG. 1 is a plot of brightness ratio of viewfinder brightness to object brightness vs. field of view for four well-known single lens reflex cameras.

FIG. 1 exemplifies the decrease in brightness of the viewfinder image as a lens is changed on various cameras from a 50mm focal length, f/1.8 lens on a standard viewing screen as supplied with the camera, and a 135mm focal length f/2.8 lens of the same manufacturer with the same viewing screen. The ordinate "Brightness Ratio" is the ratio of the brightness of the object as seen in the viewfinder to the actual brightness of the object. The abscissa is the field of view as seen in the eyepiece. The curves A, B, C, D represent 50mm focal length, f/2.0 lenses supplied with the cameras of different manufacturers while the curves A', B', C', and D' represent the same cameras with the same manufacturer's 135mm f/2.8 lens thereon.

The closely approximate distances of the exit pupil of each lens from the focal plane is shown in Table I.

TABLE I

|   | 50mm Lens | 135mm Lens |
|---|-----------|------------|
| A | 59mm | 75mm |
| B | 100mm | 92mm |
| C | 74mm | 71mm |
| D | 60mm | 88mm |

The foregoing values are accurate within a very small percentage (less than 5%) and exemplify the change in exit pupil location of lenses of various focal length.

The curves of FIG. 1 and the data of Table I exemplify the change in brightness of the viewed image with change in position of the exit pupil of the lens. Other factors also enter into the different brightness ratios of the different systems such as scattering on the focusing screen, etc. and general optical design of the viewing system. Therefore, the curves A, B, C, and D should not be compared to each other, but only A and A'; B and B'; etc.

It should be recalled that the exit pupil is defined in the *Military Standard Optical Terms and Definitions,* MIL-STD-1241H, Mar. 31, 1967 as "The image of the limiting stop in an optical system formed by all lenses following this stop". In photographic objectives this image is virtual and usually not far from the iris diaphragm. The position of the exit pupil therefore is not a direct function of the focal length of the lens. In fact, the percent distance change in location of exit pupil may be greatest when going from the standard 50mm lenses to a so-called retrofocus or wide angle lens of 28mm or 35mm focal length, with change in focal length as a base.

Most single lens reflex cameras are designed with a field lens which images the exit pupil of the standard camera manufacturers' lens at a known distance from the focal plane in the standard 50mm focal length manufacturers' lens. As used herein the standard lens supplied with a single lens reflex camera also refers to lenses of slightly greater focal length than 50mm, such as 55mm.

To overcome the difficulties in viewing brightness with changes of exit pupil location the present invention provides a viewing system with moving optical elements to properly image the lens exit pupil.

As shown in FIG. 2, a single lens reflex camera 10 comprises a camera body 11 having a lens 12 detachably mounted thereto. The focal plane FP of the camera is behind the usual pivotal mirror 13. The mirror 13 reflects light to a focusing screen 14 optically equidistant from the lens exit pupil as the focal plane. Disposed above screen 14 is a movable (vertically, as shown) field lens 15, a prism 16, and an eyepiece 17 comprising two movable groups 18 and 19.

Prism 16 has an entrance surface or window 20, and exit surface or window 21, and first and second reflecting surfaces 22 and 23 therebetween. The entrance surface 20 is made concave to introduce negative optical power and not increase the size of the prism, as would be required by movement of the field lens.

As the position of the lens exit pupil is moved from the focal plane, field lens 15 moves away from the exit pupil to properly image the exit pupil. Simultaneously, eyepiece lens group 18 moves toward eyepiece lens group 19 to maintain the equivalent focal length of the viewing system, i.e., prevent change in magnification and maintain the image in focus. The eyepiece lens 19 also moves with respect to reference point R defined by the distance $L_H$ to maintain focus. Thus the field lens is positioned as a function of the location of the exit pupil, and the movable eyepiece groups 18 and 19 are positioned as functions of the position of the field lens.

In order to decrease the size of the prism it is preferred to position a separate negative element 25 in fixed position between prism 20 and field lens 15, as shown in FIG. 3. In FIG. 3 like reference characters to those of FIG. 2 identify like elements. Additionally, in FIG. 3 optical elements are identified as L1-L10 with surfaces R1-R17 for purposes of later disclosure. The distance of the surface R1 to the horizontal optical axis of the prism is $L_D$ and the distance from the vertical optical axis of the prism to a reference point R is $L_H$. The addition of this negative power permits a smaller entrance surface on the prism and hence a smaller prism.

The lens 25 is preferably bi-concave to share power on each surface and minimize undesired aberrations. The relationship of the lens 25 and prism 16' of FIG. 3 is set forth in greater detail in the copending application Ser. No. 648,780 filed on the same date as this application, the disclosure of which is incorporated herein by reference.

In practice it is preferred to code a particular lens to the camera and automatically position the movable elements of the viewing system in accordance with the lens. This is schematically exemplified in FIG. 4 where a coding pin 27 on a lens is positioned in accordance with exit pupil location P or P'. If a lens with exit pupil location P' is fitted to the camera, such lens through coding pin 27 and a mechanism hereinafter described moves field lens 15 to the position 15' shown in broken line, and eyepiece 18 is also moved to the position 18' shown in broken line. Eyepiece 19 also moves to maintain focus as hereinafter described.

Reference is now made to FIGS. 5 – 7 which exemplify an operating mechanism for the system of FIG. 3. Field lens 15 is in a mount 30 movable in a guide 31 having a bottom limit 32. Lens 15 is biased downwardly toward its lower position for the closest exit pupil position to the focal plane by a spring 33 connected between body 11 and a pin 34 on mount 30 extending through a slot 35 in guide 31. Eyepiece 18 is in a mount 36 movable in a guide 36a.

Eyepiece group 19 is in a mount 19a movable in a guide 38. A spring 37 biases groups 18 and 19 toward each other in this embodiment. A slot 36b in guide 36a defines the limits of motion of mount 36, and a slot 19b in guide 38 defines the limits of motion of mount 19a.

A mechanism is provided within body 11 comprising a ring-like member 40 having an internal extension 41 (FIG. 6) adapted to be engaged and rotated by lens pin 27. Ring 40 is in a guide channel 42 in body 11, and is pivotal therein.

The opening 40a in ring 40 is sufficiently large as not to interfere with the optical system, or the lens mount. An arm 43 extends rearwardly of ring 40. A link 44 connects the end of arm 43 to a cam 46 which is pivoted with respect to body 11 at 47 and acts on mount 30. Cam 46 is contoured to move lens 15 upwardly in accordance with the angular rotation of ring 40. The degree of rotation of ring 40 from a normal position is dependent on the angular rotation of pin 27 on the lens. The lens coupling is of the bayonet type where the mount is initially engaged to the body in a predetermined position and is then rotated approximately 70° to a lock position. The latter part of such rotation causes engagement of a pin 27 with projection 41. The position of pin 27 on the lens will thus predetermine the movement of ring 40 and cam 46, and hence the movement and location of field lens 15.

A second cam 49 is pivoted with respect to body 11 at 50 and is arranged to act on mount 36 of group 18 and mount 19a of group 19. A link 51 is pivotally mounted at either end thereof at 52 and 53 between cams 46 and 49 whereby the eyepiece group 18 is positioned as a function of the position of field lens 15.

As shown, lenses 15 and 18 have been moved from the normal position as arm 43 moves upwardly. Cam 46 has pivoted clockwise to move lens 15 upwardly against the bias of spring 33. The pivot point 52 of link 51 has moved clockwise about pivot point 47, and cam 49 has pivoted clockwise to permit spring 37 to move lens group 18 to the right, as viewed in FIG. 5, and group 19 to move to the left. Cam 49 has a lobe 55 acting on mount 36 and a lobe 56 acting on mount 19a. The lobes are contoured in relation to pivot point 50 yo permit the predetermined movement of groups 18 and 19.

As shown in FIG. 5, the degree of movement and hence the final position of lenses 15, 18 and 19 is determined by pin 27 and the shape of cams 46 and 49. Obviously, the cams may be shaped to give a desired location dependent on the optical design of the viewfinder system. The system shown is for a counterclockwise locking turn of the lens 13, but may obviously be modified for a clockwise locking motion of the lens mount. When a lens 13 is removed from the camera, the spring 33 will move lens 15 toward its normal position against stops 32, and cam 49 will be pivoted by link 51 in response thereto to position groups 18 and 19.

Means are also provided for manually positioning the field lens 15 and the eyepiece lenses. Defined in body 11 is a slot 60. Extending through slot 60 into ring 40 is a locking screw 61 having a finger wheel 62, and a locking flange 63 thereon. When screw 61 is loose, ring 40 is free to rotate to a position determined by a lens coding pin 27.

If a lens not coded by a pin 27 is used with the camera, screw 61 may be utilized to rotate ring 40 and manually set the position of lenses 15 and 18. Then the screw is tightened in ring 40 with flange 63 against body member 64. This locks lenses 15, 18 and 19 into a set position. A calibration scale, not shown, may be defined on body portion 64 to properly identify the setting of ring 40 in terms of the focal lengths of the camera manufacturers' lens and/or in terms of the distance of lens exit pupil from the focal plane. When a lens with coding pin is used, the screw 61 is in a non-locking position to permit positioning of the lens elements.

The optical characteristics of the view finder system of FIGS. 3 and 5 is substantially given by the data of Table II.

TABLE II

| Lens | Surface(mm) | Axial Distance Between Surfaces(mm) | $N_d$ | $V_d$ |
|---|---|---|---|---|
| L1 | R1 | 22.26 (Fresnel) | | |
| | | 1.50 | 1.586 | 29.9 |
| | R2 | plano | | |
| | | .050 | | |
| L2 | R3 | 41.33 | | |
| | | 8.45 | 1.713 | 53.9 |
| | R4 | −274.99 | | |
| | | 8.50 | | |
| L3 | R5 | −89.18 | | |
| | | 1.50 | 1.805 | 25.5 |
| | R6 | 37.78 | | |
| | | 3.55 | | |
| L4 | R7 | plano | | |
| | | 72.00 | 1.717 | 29.5 |
| | R8 | plano | | |
| | | .050 | | |
| L5 | R9 | 44.77 | | |
| | | 4.90 | 1.517 | 64.2 |
| L6 | R10 | −57.471 | | |
| | | 2.00 | 1.517 | 64.2 |
| | R11 | −51.01 | | |
| | | 0.50 | | |
| L7 | R12 | 25.61 | | |
| | | 5.88 | 1.62 | 60.3 |
| | R13 | −31.24 | | |
| L8 | | 1.50 | 1.744 | 44.9 |
| | R14 | 65.37 | | |
| | | 4.12 | | |
| L9 | R15 | 82.49 | | |
| | | 1.50 | 1.580 | 61.3 |
| | R16 | 61.50 | | |
| L10 | | 2.00 | 1.487 | 70.4 |
| | R17 | 18.94 | | |

Where $N_d$ and $V_d$ are the index of refraction and Abbe Numbers.

The movements of the lens groups are given for various exit pupil locations in Table III for the distances D1 − D5 as shown in FIG. 3.

TABLE III

| Exit Pupil to Focal Plane (mm) | D1 (mm) | D2 (mm) | D3 (mm) | D4 (mm) | D5 (mm) |
|---|---|---|---|---|---|
| 48.0 | 0.50 | 8.500 | 0.500 | 4.124 | 1.089 |
| 57.0 | 2.30 | 6.70 | 1.039 | 3.262 | 1.412 |
| 68.0 | 4.10 | 4.90 | 1.578 | 2.399 | 1.736 |
| 84.5 | 5.90 | 3.10 | 2.117 | 1.536 | 2.060 |
| 105.0 | 7.70 | 1.30 | 2.656 | 0.674 | 2.383 |

Where $L_H = 33.40$mm and $L_D = 24.01$mm

FIG. 8 is a plot of the ratio of corner brightness to the center brightness of an image viewed in a viewfinding system embodying the invention as ordinate, versus the distance of the objective lens entrance pupil to the focal plane as abscissa. With an objective lens of f/2.0 relative aperture, a uniform brightness is achieved for exit pupil distances of 43mm to 110mm. At a smaller relative aperture of f/3.5, the contrast would start to exceed ten percent outside of a range of 55mm to 105mm exit pupil distance. The brightness ratio is calculated without consideration of vignetting or screen scattering.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. In a viewing system for a single lens reflex camera having a focal plane comprising a viewing screen, a field lens, a prism and an eyepiece, said camera having the ability to accept lenses having exit pupils of varying location with respect to the focal plane of said camera, the improvement comprising a movable field lens between said screen and said prism, and means for positioning said movable field lens between said prism and said screen as a function of the location of the exit pupil of a lens mounted to said camera.

2. The combination of claim 1 wherein said positioning means comprises manually adjustable means on said camera and linkage means connecting said adjustable means to said field lens.

3. The combination of claim 1 further including a lens mountable to the camera, said lens having exit pupil position coding means thereon, and said means for positioning comprises linkage means in said camera and actuated by said coding means for predetermining the position of said field lens.

4. The combination of claim 1 further including means for positioning said eyepiece in accordance with the position of said field lens.

5. The combination of claim 4 wherein said eyepiece comprises first and second lens groups, one of said groups positionable to maintain constant magnification, the other of said groups positionable to maintain focus with position of said field lens.

6. The combination of claim 5 further including an objective lens mountable to the camera, said lens having exit pupil position coding means thereon, and linkage means in said camera actuated by said coding means for predetermining the position of said field lens and said eyepiece groups.

7. the combination of claim 6 further including means independent of said objective lens on said camera for positioning said field lens and said eyepiece lens.

8. The combination of claim 1, wherein said field lens is of positive power, said prism has an entrance window and exit window and two reflecting surfaces therebetween, and means introducing negative optical power between said field lens and the exit window of said prism.

9. The combination of claim 8 wherein said negative power introducing means is a concave entrance window on said prism.

10. The combination of claim 8 wherein said negative power introducing means is a negative lens between said field lens and said entrance window.

11. The combination of claim 4 wherein said field lens is of positive power, said prism has an entrance window and exit window and two reflecting surfaces therebetween, and means introducing negative optical power between said field lens and the exit window of said prism.

12. The combination of claim 10 wherein said negative power introducing means is a concave entrance window on said prism.

13. The combination of claim 11 wherein said negative power introducing means is a negative lens between said field lens and said entrance window.

14. In a single lens reflex camera having a demountable objective lens, a pivotal mirror behind the objective lens in front of the focal plane arranged to reflect an image to a viewing system comprising a focusing screen, a field lens, a prism having entrance and exit windows with reflecting surfaces therebetween, and an eyepiece lens in that order, the improvement comprising said field lens being movable between said screen and said entrance window, said eyepiece being positionable with respect to said exit window as a function of the position of said field lens and means for positioning said field lens between said screen and said entrance window as a function of the location of the exit pupil of said lens with respect to the focal plane.

15. The improvement of claim 14 further including means introducing negative optical power between said field lens and said exit window.

16. The improvement of claim 14 further including linkage means in said camera for positioning said eyepiece as a function of the position of said field lens.

17. The improvement of claim 16 further including coding means on said objective lens for actuating said linkage means.

18. The improvement of claim 15 wherein said negative power means is a concave entrance window on said prism.

19. The improvement of claim 14 wherein said negative power means is a negative lens between said entrance window and said field lens.

20. The combination of claim 14 wherein said eyepiece comprises first and second lens groups, one of said groups positionable to maintain constant magnification, the other of said groups positionable to maintain focus with position of said field lens.

* * * * *